(12) United States Patent
Beall et al.

(10) Patent No.: US 6,455,124 B1
(45) Date of Patent: Sep. 24, 2002

(54) METHOD FOR EXTRUDING CERAMIC HONEYCOMBS

(75) Inventors: Douglas M. Beall, Painted Post; Thomas W. Brew; Christopher J. Malarkey, both of Corning; Mark A. Spetseris, Pine City; David R. Treacy, Jr., Elmira, all of NY (US)

(73) Assignee: Corning Incorporated, Corning, NY (US)

( * ) Notice: Subject to any disclaimer, the term of this patent is extended or adjusted under 35 U.S.C. 154(b) by 133 days.

(21) Appl. No.: 09/727,741

(22) Filed: Dec. 1, 2000

(51) Int. Cl.⁷ .................................................. B32B 3/12
(52) U.S. Cl. ...................... 428/116; 264/631; 264/630; 264/638; 264/639
(58) Field of Search .................................. 428/116, 118, 428/364, 372, 402; 264/603, 629, 630, 631, 638, 639

(56) References Cited

U.S. PATENT DOCUMENTS

| | | |
|---|---|---|
| 3,790,654 A | 2/1974 | Bagley |
| 3,885,977 A | 5/1975 | Lachman et al. |
| 3,947,214 A * | 3/1976 | Cunningham |
| 4,168,944 A | 9/1979 | Morikawa et al. |
| 4,298,328 A | 11/1981 | Frost |
| 4,349,329 A | 9/1982 | Naito et al. |
| 4,368,025 A | 1/1983 | Naito et al. |
| 4,381,912 A | 5/1983 | Yamamoto et al. |
| 4,668,176 A | 5/1987 | Zeibig et al. |
| 4,710,123 A | 12/1987 | Ziebig et al. |
| 4,814,187 A | 3/1989 | Inoue et al. |
| 5,219,509 A | 6/1993 | Cocchetto et al. |
| 5,876,804 A | 3/1999 | Kodama et al. |
| 5,882,694 A | 3/1999 | Guillemette |
| 5,906,839 A | 5/1999 | Miura et al. |
| 5,980,227 A | 11/1999 | Murata et al. |

* cited by examiner

Primary Examiner—Deborah Jones
Assistant Examiner—Wendy Boss
(74) Attorney, Agent, or Firm—Kees van der Sterre

(57) ABSTRACT

Fine circumferential skin cracking in extruded thin-walled cordierite honeycombs having channel wall thicknesses not exceeding about 0.004 inches (100 μm) but skin layers of substantially higher thickness is prevented by extruding the honeycombs under conditions that enhance cordierite crystal alignment in the skin; thin-walled honeycomb products having skins free of fine cracks that are well-matched in thermal expansion to the honeycomb cores are provided.

7 Claims, 3 Drawing Sheets

METHOD FOR EXTRUDING CERAMIC HONEYCOMBS

BACKGROUND OF THE INVENTION

This invention relates to the production of low-expansion, thin-walled cordierite ceramic honeycomb structures from magnesia, alumina, and silicate source materials. More particularly, the invention relates to an improved extrusion method for forming high quality, thin-walled honeycomb structures free of circumferential skin cracks.

The use of honeycomb extrusion dies to form cellular ceramic honeycombs of cordierite composition and very low thermal expansion from plasticized mixtures of ceramic batch materials is described in U.S. Pat. Nos. 3,790,654 and 3,885,977. Such honeycombs remain in widespread commercial use as catalyst supports for emissions control applications such as automotive exhaust treatment systems.

The large body of prior art pertaining to cordierite honeycomb extrusion includes honeycomb extrusion dies of many different constructions and modes of operation, all being generally designed to form cordierite honeycombs having a webbed cellular or channeled core structure surrounded in most cases by a smooth integral outer skin layer. Typically, the honeycomb extrusion dies employed are multi-component assemblies including at least a web-forming die body combined with a skin-forming mask or mask assembly attached to the outlet side of the die body. The die body incorporates inlet channels or feedholes leading to an intersecting array of discharge slots on the discharge face of the die through which the batch material is extruded as crisscrossing webs forming the central channeled core structure of the honeycomb. The mask is generally a ring-like circumferential structure in the form of a collar defining the periphery of the honeycomb and against which the outer skin layer of the honeycomb is formed.

Many of the known prior art die constructions are designed specifically to overcome the interrelated problems of poor skin adherence to the webbed honeycomb core and distortion of the peripheral webs of the core as the skin is joined therewith during the extrusion process. Skin adherence requires the development or maintenance of at least some convergent bonding pressure between the extruding skin and the webs forming the peripheral cell walls, but too much pressure results in a distortion of the peripheral webs and cells of the honeycomb.

U.S. Pat. No. 4,349,329 discloses an extrusion die particularly designed to minimize peripheral cell distortion. In that design, batch material for the skin is collected in a pooling zone beneath the skin-forming mask and is then extruded through a gap between the die body and mask to join with an extruding webbed honeycomb core portion issuing from the die body. The core portion features thickened peripheral webs forming channel walls that resist distortion as the skin joins the core portion during extrusion. U.S. Pat. No. 5,219,509 describes another die design wherein a separate stream of batch material for the skin flowing inwardly from a peripheral collection zone beneath the mask is redirected by the mask and die body onto a flow path nearly parallel with but converging slightly toward the honeycomb extrusion axis of the die. This design also minimizes the distortion of web portions of the peripheral cells, in this case by limiting the skin pressure applied to the cells.

The art is also aware of various means for controlling the thickness of the extruded skin. U.S. Pat. Nos. 4,668,176 and 4,710,123, for example, describe die designs wherein skin thickness can be controlled by controlling the width of the gap formed between the die body and mask. Also shown are means for adjusting the supply of batch material to the skin-forming section of the die to maintain the material flow needed to provide the selected skin thickness.

A common feature of the extrusion process as practiced in the prior art is that of extruding the plasticized batch material at batch pressures and viscosities where the speed of skin extrusion will substantially match the speed of honeycomb core extrusion. Published Japanese patent application JP 61-005915, for example, discloses die modifications expressly designed to properly match the core extrusion rate with the skin extrusion rate. Matching is viewed as important because excessive shear between the webbed core and skin sections of the extruding honeycomb at the site of the core-skin interface has been thought to contribute to reduced skin adherence, increased peripheral web distortion, or both.

Tightening emissions control regulations, particularly for automobiles, require honeycombs of substantially decreased wall thickness and increased channel density for improved catalytic efficiency. For example, the demand for ultra-thin-wall honeycombs, defined for present purposes as honeycombs having channel wall or web thicknesses of 0.004 inches (0.10 mm) or less, is increasing substantially. At the same time, honeycombs incorporating from 600–1200 channels/square inch (about 90–190/cm$^2$) are entering advanced development or commercial use.

Although current and emerging extrusion die designs can be adapted to the extrusion of ultra-thinwall honeycombs with no gross forming defects, new problems unique to these fine-structured products still must be solved. One such problem relates to skin defects referred to as "hoop cracks", which are cracks transverse to the channel axis of the honeycombs that appear to develop within the skin layers of the ultra-thinwall honeycombs only during firing. These cracks, which can occur at multiple points along the length of a cracked honeycomb and extend over significant portions of the honeycomb circumference, render the products unacceptable for sale. Extensive experiments designed by us to identify the origin of this cracking behavior established that the cracks developed during the cooling phase of the firing cycle.

Conventional extrusion methods and apparatus that can produce defect-free fired honeycombs at conventional skin and web thicknesses tend to produce hoop-cracked fired ware with certain batch mixtures at ultra-thinwall web thicknesses. These cracks develop even though no incipient or partially developed cracking defects have been detected in the wet or dried green extruded honeycombs from which the fired honeycombs are made.

SUMMARY OF THE INVENTION

Extensive experiments designed by us to identify the origin of this cracking behavior have established that the circumferential hoop cracks in the skins of ultra-thinwall honeycombs develop during the cooling phase of the firing cycle. Based on this finding and further analysis, this crack development has been correlated with a mis-alignment of high-aspect-ratio batch particles that develops in the extruding skin layer during the extrusion process.

The present invention achieves the elimination of this hoop cracking by improving the alignment of batch particles in the skin so that the degree of alignment achieved is similar to the degree of alignment observed in the webbed core portions of the honeycombs. This result is obtained by changing the way in which the skin layers of the ultra-thinwall honeycombs are extruded.

In a key aspect, therefore, the invention resides in an improved extrusion method through which a crack-free honeycomb body having a central webbed core structure and a peripheral outer layer or skin may be formed. The generalized method involves the known fundamental steps of extruding a plasticized powder batch material through a honeycomb extrusion die assembly. The die assembly comprises a die body and a skin-forming mask, and the basic steps of the method are analogous to those employed for the production of conventional honeycombs.

The core or central webbed structure of the honeycomb is conventionally formed by batch material extruded through a criss-crossing array of discharge slots on the outlet face of the die body, these slots being supplied with batch material via feedholes through the body connecting the slots with a pressurized supply of batch material in a batch reservoir behind the inlet face of the die. The peripheral skin layer of the honeycomb is formed by batch material extruded through a skin-forming gap provided between the mask of the die and the outlet face thereof.

To achieve the alignment of high aspect ratio particles in the skin that is required to provide crack-free ultra-thinwall products in accordance with the invention, the relative speeds at which the webbed core and peripheral skin are extruded through the skin-forming gap in the die should be controlled such that the extrusion speed of the skin ($V_S$) through the skin-forming gap is less than the extrusion speed of the webbed core ($V_W$) exiting the die discharge slots. The difference in extrusion speeds is closely controlled. We have determined that good particle alignment can be assured if the extrusion speed of the skin through the gap is in the range of 50–95% of the speed of extrusion of the core portion of the honeycomb. This is in contrast to the matching of core and skin extrusion speeds practiced in the prior art.

Maintaining an extrusion speed differential with a higher core than skin extrusion rate causes the extruding skin layer to be drawn out, over the interval between the point of its formation at the skin-forming gap of the extrusion die and the point at which it reaches speed parity with the webbing of the honeycomb core. At the latter point the skin reaches an equilibrium thickness; therefore an equivalent indicator of good particle alignment in the skin is the relationship between the width of the skin-forming gap defining the initial skin layer thickness and the ultimate thickness of the skin on the fully extruded honeycomb. The formation of a peripheral skin layer on the extruded honeycomb having a thickness in the range of 50–95% of the width of the skin-forming gap will insure that good alignment of high-aspect-ratio batch particles in the skin will be achieved.

Any of a variety of extrusion control strategies may be used to provide useful differentials in core and skin extrusion rates, or effective skin elongation and thinning, during the extrusion process. A common characteristic of these strategies is the avoidance, in ultra-thinwall honeycomb manufacture, of any extrusion condition that results in any thickening or compaction of the skin-forming layer after it is discharged from skin-forming gap and during its bonding with the webbed core. We have found that skin extrusion at rates equal to or higher than the corresponding core extrusion rates appears to compact the skin layer and thereby substantially increase the likelihood of encountering hoop cracking in the finished product.

Without intending to be bound by theory, it is presently thought that the particle realignments that can occur at matching or excessive skin extrusion rates substantially increase thermal expansion differentials between the core and skin sections of fired ultra-thinwall honeycombs. These thermal expansion differentials could cause hoop cracking in the higher expansion skins as the honeycombs are cooled to ambient temperatures after firings.

The product of the process as above described is a thin-walled honeycomb product that is free of circumferential skin cracks as made, and more likely to resist thermal damage in use than conventionally extruded honeycombs of similar geometry. These advantages are derived from the fact that the degree of cordierite crystal alignment in the honeycomb skins is substantially the same as the degree of cordierite crystal alignment in the honeycomb webs. In another aspect, then, the invention includes an extruded cordierite honeycomb body of thin-walled geometry with improved thermal durability as well as improved skin integrity.

In geometry, the cordierite honeycombs of the invention include a webbed core section comprising webs having a web thickness not exceeding about 0.004 inches, and a crack-free extruded skin layer disposed on the webbed core section. The extruded skin layer will have a thickness of at least twice the thickness of the webs forming the honeycomb core. More typically, the skin thickness will be 3–10 times the web thickness.

Characteristic of these honeycombs, the extent of cordierite crystal alignment obtained in the honeycomb skins is close to or substantially matches the degree of cordierite crystal alignment developed in the webs of honeycomb core. The degree of cordierite crystal alignment in each of the skin and web sections of the honeycombs may be determined in the known manner from x-ray diffraction analyses of the two sections. Thus, for these honeycombs, the x-ray diffraction I-ratios (IR), determined in the known manner for each of the skin and web sections from the formula:

$$I_R = \frac{I_{(110)}}{I_{(110)} + I_{(002)}}$$

will be similar or substantially the same in value.

DESCRIPTION OF THE DRAWINGS

The invention may be further understood by reference to the drawings, wherein.

DETAILED DESCRIPTION

While the invention has wide application to the production of cordierite honeycomb products from a variety of batch mixtures of various compositions, it can be used to particular advantage with batch mixtures comprising substantial powder fractions of highly platey talc crystals. As is known from U.S. Pat. No. 3,885,977, the thermal expansion characteristics of extruded cordierite honeycombs depend in large part on an appropriate preferential alignment of talc particles within the skin and walls of the honeycomb.

Preferential talc crystal alignment, which results from batch shearing during extrusion of the batch through the relatively thin discharge slots of honeycomb extrusion dies, results in a corresponding preferential alignment of the cordierite crystals that develop within the honeycombs as the green honeycombs are fired. The greater the degree of preferential alignment of the talc (and the later-developed anisotropic cordierite crystals), the greater the anisotropy and the lower the critical thermal expansion properties of the cordierite products.

Figure 1:
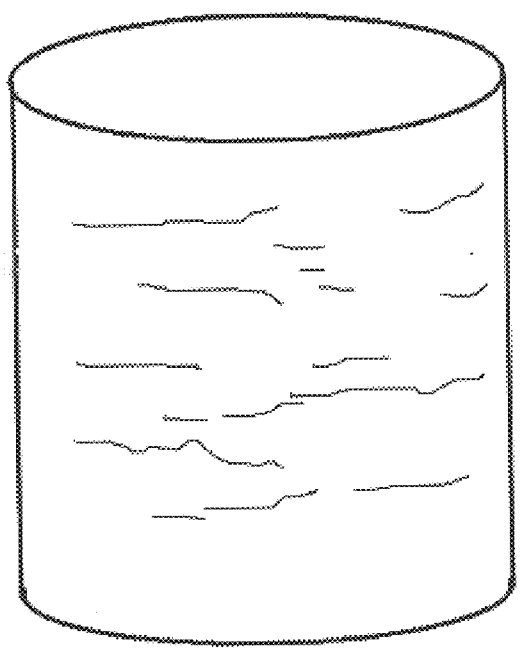
FIG. 1 schematically illustrates the appearance of a prior art thin-wall honeycomb body wherein circumferential skin cracks have developed after firing.

The circumferential or hoop cracking observed in the skin layers of extruded cordierite honeycombs, although relatively subtle, is most common in honeycombs with relatively thin webs forming the channel walls and skin layers, and particularly in ultra-thinwall products with fired web thicknesses of 0.004 inches and below. FIG. 1 of the drawing schematically illustrates a typical skin cracking pattern that can be observed in thin-walled honeycombs after firing. In general, hoop cracking, although structurally significant, is difficult to detect visually and is best observed by wetting the peripheral skins of the fired honeycombs, with or without a stain indicator such as methylene blue to highlight the crack structure.

Diagnosis of the cause of hoop-cracking defects is complicated by the fact that they cannot be associated with incipient cracks or other localized defects in the green skin layers of the honeycombs formed during extrusion. Further, no cracking of honeycomb web sections immediately adjacent to or spaced from the cracked skin layers is evident, either before or after the honeycombs are fired.

Figure 2:
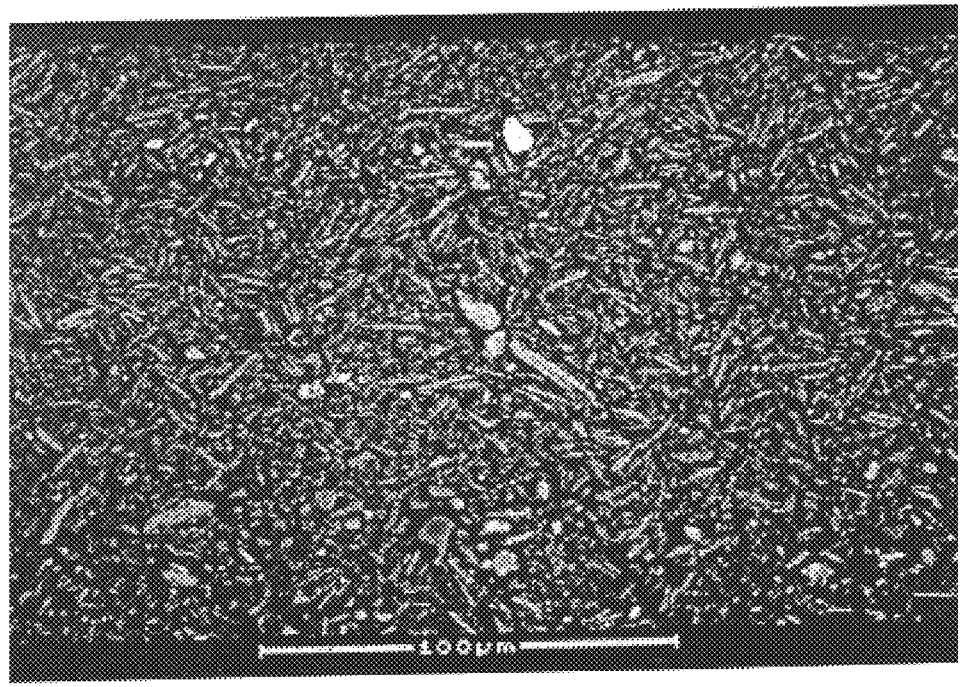
FIG. 2 is a photomicrograph of a cross-section of a fired skin layer in a honeycomb body provided in accordance with the prior art.
Figure 3:
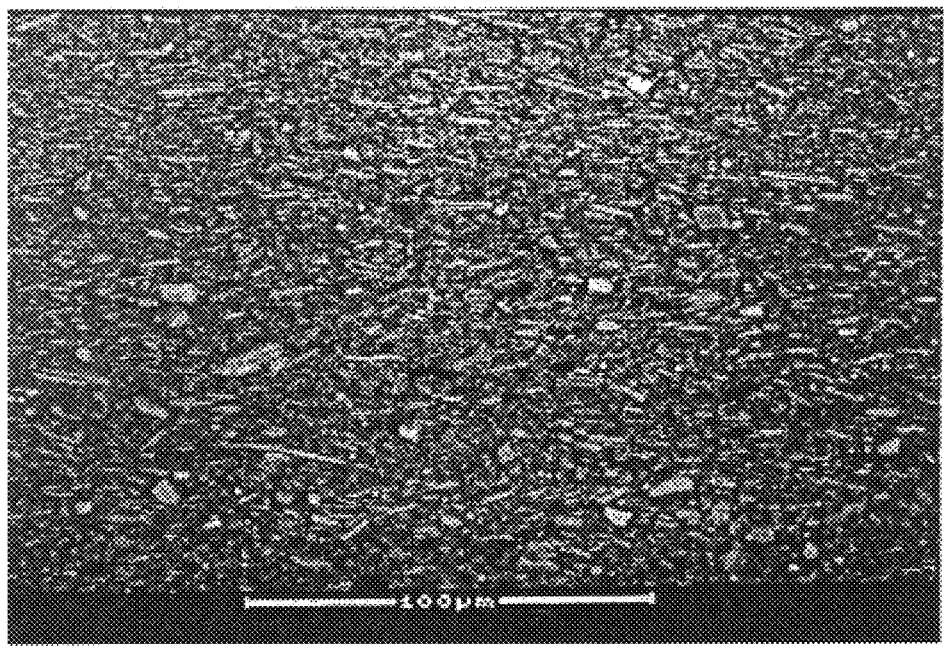
FIG. 3 is a photomicrograph of a cross-section of a fired skin layer in a honeycomb body provided in accordance with the invention.

The conclusion that a thermal expansion differential between the skin layers and adjacent web sections of fired honeycombs is the cause of the hoop-cracking problem is supported by electron photomicrographs indicating a difference in talc particle alignment between the unfired skins of hoop-cracked and defect-free fired honeycombs. This difference in talc particle alignment can be seen from a comparison of the photomicrographs presented in FIGS. 2 and 3 of the drawings. FIG. 2 is a scanning electron photomicrograph of a cross-section of an extruded skin layer of an unfired ultra-thinwall honeycomb body provided in accordance with the prior art, wherein the white bar corresponds to a dimension of 100 $\mu$m. FIG. 3 is a similar scanning electron photomicrograph taken at the same magnification of an extruded skin section of an unfired honeycomb body provided in accordance with the invention.

In each of these photomicrographs, the elongated light-colored particulate inclusions are the edges of the talc platelets that show up against the darker background of the surrounding material. The talc platelets in FIG. 2 are nearly randomly oriented, whereas the platelets in FIG. 3 are substantially aligned in horizontal planes. The degree of particle alignment shown in FIG. 3 is very similar to the degree of talc alignment found in the adjacent core sections of both of the extruded honeycombs, whereas the misalignment shown in FIG. 2 is confined to the skin layer of the prior art honeycomb.

Based on present understandings of cordierite development during the firing of these bodies, the talc platelet misalignment within the skin of the honeycomb shown in FIG. 2 would be expected to result in cordierite crystal misalignment after the honeycomb is fired, a circumstance that would impart a higher thermal expansion coefficient to the honeycomb skin layer than to the adjacent webs, in directions parallel with the honeycomb webs and channels. In that case, during the cooling of the fired cordierite honeycomb to room temperatures after firing, the thin skin layer of the honeycomb would shrink more than the adjacent core, would be put into tension, and would ultimately crack.

Achieving a complete solution to the hoop cracking problem is complicated by the fact that similarly disposed skin cracks, known and referred to in the prior art as "air checks", can result from excessive tension in the skin arising during the extrusion process. In the past, such cracking has required that the speed of skin extrusion be increased, rather than decreased, to eliminate tension in the skin layer during extrusion. However, such increases are found to aggravate the problem of fired hoop cracks in the skin, and accordingly a proper balance between core and skin extrusion rates must be maintained.

The effects of varying skin extrusion speed on the level of hoop cracking can be demonstrated through extrusion experiments wherein the speed of skin extrusion versus core extrusion is varied over a range from somewhat below to somewhat above the core extrusion rate. A principal effect of this speed variation is a variation in final skin thickness, as measured by the ratio of final skin thickness on the honeycomb to the width of the skin extrusion gap on the honeycomb extrusion die.

Figure 4:
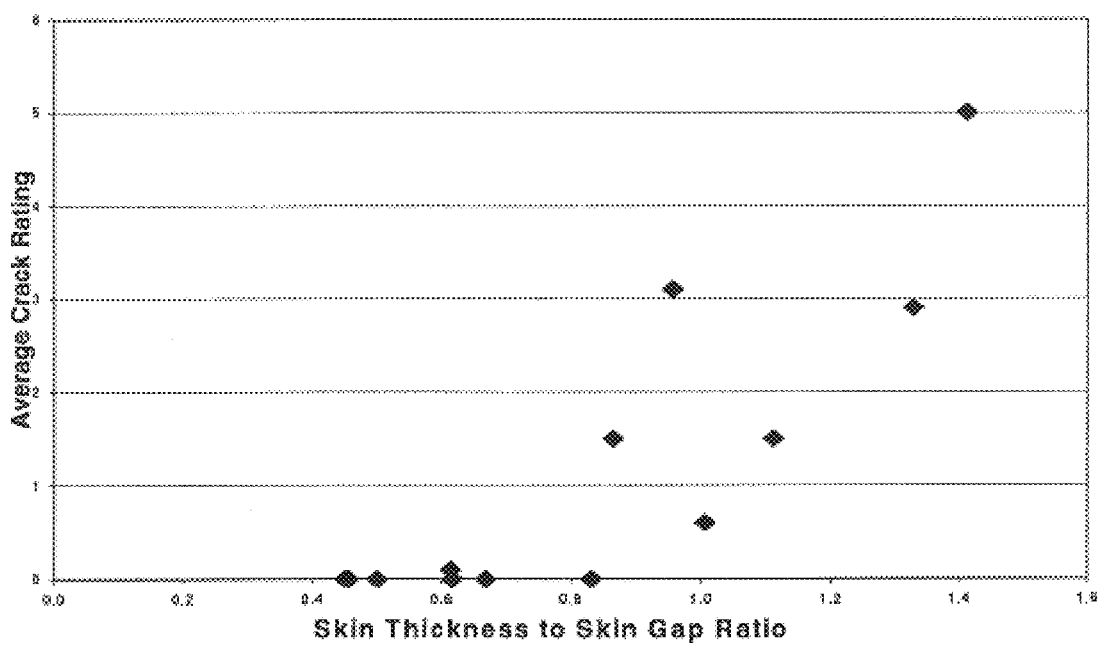
FIG. 4 is a graph showing some effects of skin thickness variations on skin cracking defect levels in ultra-thinwall honeycombs.

FIG. 4 of the drawings is a graph plotting the extent of hoop cracking for a number of such extrusions on an arbitrary crack severity scale from 0 to 5. Crack severity in FIG. 4 is plotted against the ratio of skin thickness to skin gap width for each of the extrusion runs reported. On the severity scale explored, a 0 crack rating corresponds to no hoop cracking, a 3 rating to modest cracking visible only with indicator highlighting, and a 5 rating to cracking visible to the unaided eye.

As is evident from a study of FIG. 4, little or no hoop cracking is observed at skin thickness:skin gap ratios below 1:1. On the other hand, significant cracking is much more frequent at thickness:gap ratios of 1:1 and above. Similar experiments have confirmed that hoop-cracking can be substantially avoided at skin thickness:skin gap ratios in the range of about 0.5:1 to 0.95:1. Further, skin extrusion at these reduced speeds can be carried out without inducing "air checks" or other forms of extrudate damage in the newly extruded parts, provided only the that binder content of the batch is high enough to allow the necessary skin elongation without breakage.

A variety of measures can be undertaken with conventional extrusion equipment to control skin extrusion speed and thickness reduction in accordance with the invention. Among these are steps to reduce the supply of skin material to the extrusion die, and to constrain skin flow at the die skin-forming gap.

In many die designs, the skin-forming gap can be adjusted to constrain skin flow simply by varying the distance between the discharge face of the die and skin-forming edge of the mask. However, while effective to reduce the skin extrusion rate, this method has the disadvantage that the required skin gap restrictions reduce the level of control over skin thickness. That is, with this method only those skin thicknesses yielding the desired skin extrusion speed can be extruded.

An alternative and presently preferred method for achieving the desired skin reductions and relationship between skin extrusion speed and core extrusion speed is to adjust the hydraulic pressure and thus the flow rate of the batch material delivered to the skin-forming gap. This approach can provide a skin extrusion speed that is completely independent of the size of the skin-forming gap. The hydraulic pressure of the delivered material can be adjusted in a number of ways, including the use of variations in the length, shape, or combined cross-sectional area of the feedholes or feed slots supplying the skin-forming gap with the batch material.

A number of current extrusion die designs deliver batch material to the skin-forming gap from an accumulation of batch material collected in a skin-forming reservoir within the die assembly upstream of that gap. By upstream of the skin-forming gap is meant a location for the reservoir that lies closer to the pressurized supply of batch material than does the gap.

Examples of extrusion dies of this type are shown, for example, in U.S. Pat. Nos. 4,381,912, 5,219,509 and 5,906,839. The manner in which the relationship between skin extrusion speed and core extrusion speed can be controlled through the use of one such die is described with reference to FIG. 5 of the drawings in the following example, which is intended to be illustrative rather than limiting.

EXAMPLE

Figure 5:
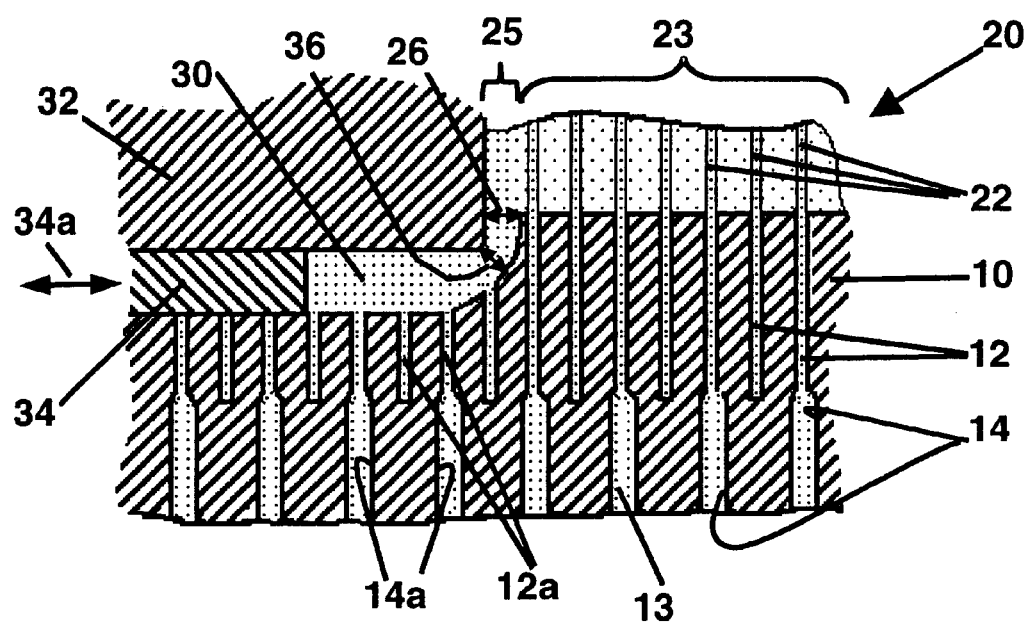
FIG. 5 is a schematic cross-sectional illustration of the skin-forming section of an extrusion die.

An extrusion die having a skin-forming arrangement as shown in partial schematic cross-section in FIG. 5 of the drawing is first provided. As shown in FIG. 5, although not in true proportion or to scale, the die includes a die body portion 10 incorporating an array of discharge slots 12 supplied with a plasticized ceramic batch material through feedholes 14. Batch material issuing from those discharge slots, flowing in an upward direction in FIG. 5, forms webs including webs 22 that intersect to form a channeled core section (indicated by bracket 23) of an extruding honeycomb structure generally designated by arrow 20.

In dies of this design, other feedholes and discharge slots, e.g. feedholes 14a and discharge slots 12a in FIG. 5, supply portions of the same batch material to a skin reservoir 30 disposed adjacent to die body portion 10. This reservoir is formed by the space between die body 10 and a skin-forming mask 32, the latter being positioned adjacent die body portion 10 but spaced therefrom by shim 34.

The skin layer of extruding honeycomb structure 20, generally indicated by bracket 25, is formed from a stream of batch material supplied from batch reservoir 30 and extruded through a skin-forming gap 36 between die body 10 and skin-forming mask 32. The width of skin-forming gap 36 determines the initial extruded thickness of skin layer 25, although the final thickness of the extruded skin will be less than the width of that gap as hereinafter described.

In a die design such as illustrated in FIG. 5, the size of skin-forming gap varies with the size of face gap 26, which is easily measured and adjusted. Adjustment is made simply by changing the lateral offset between mask 32 and die body 10 along the horizontal direction in the drawing.

To provide an extruded honeycomb with a skin of a pre-determined thickness that is free of hoop cracks, the size of skin-forming gap 36 is first adjusted to provide a skin flow portion of a desired initial skin thickness. This initial thickness (equal to the skin gap width of the die) will be selected based both on the target final skin thickness for the honeycomb and on the skin thickness reduction to be achieved during honeycomb extrusion in order to assure talc or other high-aspect-ratio particle alignment in the skin during extrusion. For example, for the extrusion of a honeycomb having a final extruded skin thickness of 0.014 inches (0.36 mm), and to realize a suitable skin thickness:skin gap ratio of 0.875:1 for good particle alignment in the skin, the skin gap would be set at a width of 0.016 inches (0.40 mm).

The reduced skin extrusion speed necessary to arrive at this skin thickness reduction ratio is achieved by reducing the extrusion speed of the batch skin portion through skin gap 36, relative to the extrusion speed of batch material from discharge slots 12 forming honeycomb core section 23. In the die design of FIG. 5, this flow rate reduction is achieved by reducing batch in-flow to skin supply reservoir 30, and thus the pressure of batch material within that reservoir, in order to reduce batch out-flow from the reservoir through the skin gap.

A number of different strategies may be employed alone or in combination to achieve these in-flow and out-flow reductions. First, the length of slots 12a supplying batch material to reservoir 30 can be increased, for example, by reducing the depth of the recess in die body 10 that is cut to receive shim 34 and mask 32. The shallower this cut, the longer the length of supply slots 12a versus supply slots 12 that form the webbed core portion 23 of the honeycomb, and the higher the relative flow impedance of slots 12a toward batch material entering skin reservoir 30.

In addition to this adjustment, the setback of shim 34 from the central or core-forming portion of die body 10 can be reduced by extending the shim inwardly in the direction of arrow 34a. The effect of this extension is to reduce the number of slots 12a and feedholes 14a supplying batch material to reservoir 30, thereby again reducing the rate of batch flow into that reservoir.

However, as FIG. 5 reflects, reducing the depth of the cut into die body 10 to accommodate mask 32 also reduces the height (length) of the skin-forming channel formed by the juxtapositioning of die body 10 and mask 32, wherein the skin flow portion is redirected and initially shaped into honeycomb skin layer 25. This slot section must be maintained at a length adequate to form and direct the skin flow portion toward webbed honeycomb core portion 23, so that proper bonding of the skin layer to the core without peripheral web distortion can result.

In the die design of FIG. 5 this result can be achieved largely independently of skin flow rate by adjusting the thickness of shim 34, with a thicker shim reducing the length of the skin-forming channel and vice versa. In one setup for a die of this design, a die body cut depth of 0.020 inches (0.51 mm) in combination with a shim thickness of 0.015 inches (0.38 mm) provides a skin-forming slot of adequate length for good skin bonding to the webbed core without introducing peripheral cell distortion.

In the same setup, a shim setback of 0.10 inches (2.54 mm) measured from the innermost edge of the shim (closest to the honeycomb core) to the innermost vertical or skin-forming edge of mask 32 reduces the speed of the skin flow portion through a skin-forming gap 36 of 0.018 inches (0.46 mm) width sufficiently that a skin thickness:skin gap ratio of 0.875:1, effective to provide an extruded skin of about 0.016 inches (0.40 mm) thickness with good particle alignment. Extruded, fired honeycombs provided by this procedure are accordingly entirely free of skin hoop cracks.

If necessary, reductions in skin extrusion speed may be also obtained through the use of peripheral flow restrictors of various descriptions provided on the inlet side of the extrusion die. Known in the art are numerous combinations of drilled restrictor plates and flow plates, and shims for varying restrictor or flow plate distance from the back or inlet faces of extrusion dies. These may also be used to further vary core and skin extrusion rates from dies such as shown in FIG. 5 for the purposes herein described.

As is known from U.S. Pat. No. 3,885,977, the degree of cordierite crystal alignment in cordierite ceramics can be determined by x-ray diffraction analyses of sections of the ceramic designed to ascertain crystal orientations therein. Particularly useful alignment indicators for cordierite are the reflected peak intensities from the (002) and (110) hexagonal crystallographic planes, these intensities being employed to compute an I-ratio (IR) from the formula IR=I(110)/(I(110)+I(002)) that correlates well with the degree of crystal alignment within, and coefficient of thermal expansion of, anisotropic crystalline cordierite ceramic materials.

As also disclosed in U.S. Pat. No. 3,885,977, (expressly incorporated in its entirety by reference herein), ceramics incorporating randomly oriented cordierite crystals and isotropic thermal expansions typically exhibit I-ratios in the range near 0.63–0.67 on all sample axes. On the other hand, cordierite ceramics of thin cross-section produced by the extrusion of batches containing talc or clay platelets will exhibit preferential cordierite crystal alignment, resulting in anisotropic thermal expansion behavior and I-ratios differing from the random value. The '977 patent, for example, reports I-ratios below about 0.55 for anisotropic samples having a preferred cordierite crystal orientation causing lowered thermal expansion on the axis normal to the x-ray sample slice (hereinafter called lowered expansion I-ratios), and I-ratios above about 0.8 for sample slices showing increased thermal expansion on the axis normal to the slice (called increased expansion I-ratios).

In the thin-walled honeycombs of the present invention, the compositions and batch preparation procedures for the core and skin sections are typically identical, so the differences in thermal expansion between web and skin samples depend largely on differences in the degree of alignment of high-aspect-ratio cordierite precursors such as clay and talc in the core and skin. With proper skin gap adjustment, the alignment of such particles, and therefore the I-ratios and thermal expansions of the core and skin sections of the fired honeycombs, can be closely matched.

Particularly preferred honeycomb products produced using optimal die configurations in accordance with the invention are expected to exhibit I-ratios for the web and skin sections that are substantially the same. For the purpose of the present description the I-ratios of the webs and skin are substantially the same if the average of the lowered expansion I-ratios for the skin, as determined from eight or more separate sample slices taken from different skin regions on the honeycomb, differs from the average I-ratio of the webs by less than 0.05. The procedures for carrying out x-ray diffraction analyses to determine these I-ratios are well known, and reference may be made to U.S. Pat. No. 3,885,977 and other sources for a further description of those procedures.

Of course, the foregoing examples and descriptions are merely illustrative of the invention and it will be apparent from this disclosure that numerous variations and modifications of the specific methods and apparatus hereinabove described may be resorted to by those skilled the art within the scope of the appended claims.

We claim:

1. A method for making a honeycomb structure comprising a channeled core section formed of a plurality of criss-crossing web segments and a smooth skin enclosing the core section that is free of circumferential stress cracks, wherein:

(i) the core section and skin are formed by the concurrent extrusion of the web segments and a skin layer through a honeycomb extrusion die, the web segments and skin layer being formed from a ceramic batch material comprising high-aspect-ratio ceramic particles;

(ii) the skin layer is extruded from the die at a slower speed than the web segments; and (iii) the ceramic particles in the skin layer and in the web segments are preferentially aligned with one another in the direction of extrusion, with the particles in the skin exhibiting substantially the same degree of alignment with one another other as exhibited by the ceramic particles in the web segments.

2. A method for forming a honeycomb body having a central webbed core structure and a peripheral skin layer by extruding a plasticized powder batch material from a batch reservoir through a honeycomb extrusion die assembly;

the extrusion die assembly comprising a die body and a skin-forming mask;

the webbed core structure being formed by batch material extruded through a central criss-crossing array of discharge slots on the outlet face of the die body, the slots being supplied with batch material by feedholes through the body connecting the reservoir with the slots;

the peripheral skin layer being formed by batch material extruded from the reservoir through a skin-forming gap provided between the mask and the outlet face;

the skin layer being extruded an extrusion speed such that it has a final extruded thickness that is in the range of 50–95% of the width of the skin-forming gap.

3. A method for forming a honeycomb body having a central webbed core structure and a peripheral skin layer by extruding a supply of plasticized powder batch material through a honeycomb extrusion die assembly;

the extrusion die assembly comprising a skin-forming mask attached to a die body, the die body having a die inlet face and an die outlet face;

the webbed core structure being formed by batch material extruded through a central criss-crossing array of discharge slots on the die outlet face, the slots being supplied with batch material by feedholes extending from the slots to the die inlet face;

the peripheral skin layer being formed by batch material extruded through a skin-forming gap provided between the mask and the die outlet face;

batch material for the skin layer being delivered from accumulated batch material collected from the supply in a reservoir space within the die assembly provided between the die inlet face and the skin-forming gap;

the hydraulic pressure of the accumulated batch material within the reservoir space being adjusted so that the skin layer is extruded from the skin-forming gap at a velocity $V_S$ that is less than a velocity $V_W$ at which the webbed core structure is extruded from the die outlet face.

4. A method in accordance with claim 1 wherein the ceramic batch comprises a mixture of clay, talc and alumina that reacts to form cordierite crystals upon firing.

5. A method in accordance with claim 4 wherein the talc in the ceramic batch includes talc particles that have a platelet diameter to thickness ratio in excess of 3:1.

6. A method in accordance with claim 4 wherein the honeycomb structure has web segments not exceeding 0.004 inches (0.10 mm) in thickness after firing.

7. An extruded cordierite honeycomb body having a webbed core section comprising webs having a web thickness not exceeding about 0.004 inches, an extruded skin layer disposed on the webbed core section having a skin thickness at least twice the web thickness, the webs and skin each having I-ratios (IR) reflecting a degree of cordierite crystal alignment therein, the I-ratios being determined by x-ray diffraction from the formula:

$$I_R = \frac{I_{(110)}}{I_{(110)} + I_{(002)}}$$

wherein the average I-ratios of the skin are substantially the same as the average I-ratios of the webs.

* * * * *